April 21, 1936.  C. F. HAMEL  2,038,490
TOP FOR RUMBLE SEATS
Filed April 11, 1933   3 Sheets-Sheet 1
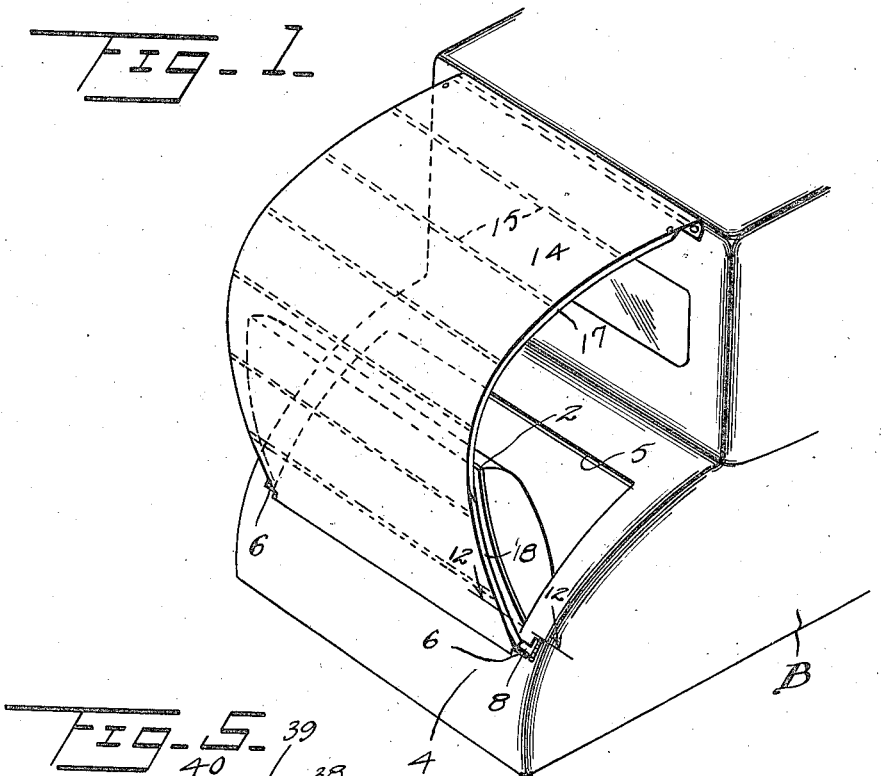
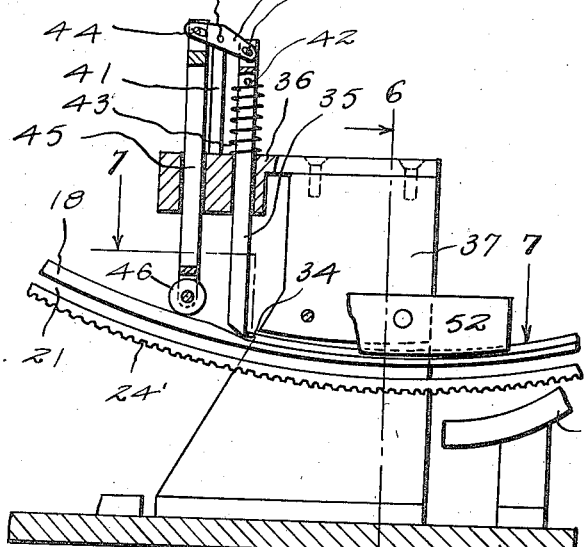
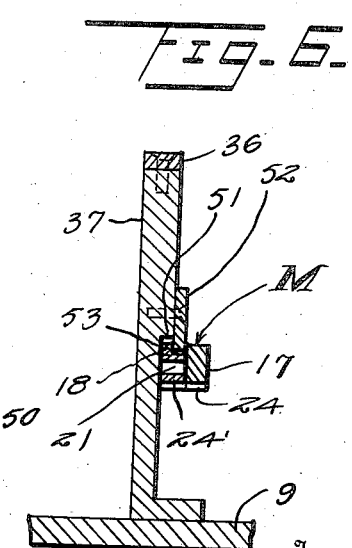
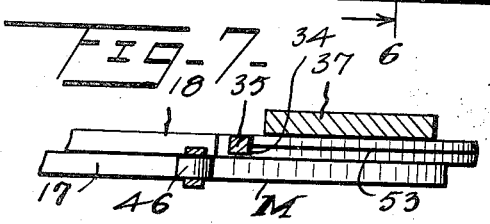
Inventor
C. F. Hamel
By Watson E. Coleman
Attorney April 21, 1936.  C. F. HAMEL  2,038,490
TOP FOR RUMBLE SEATS
Filed April 11, 1933  3 Sheets-Sheet 2
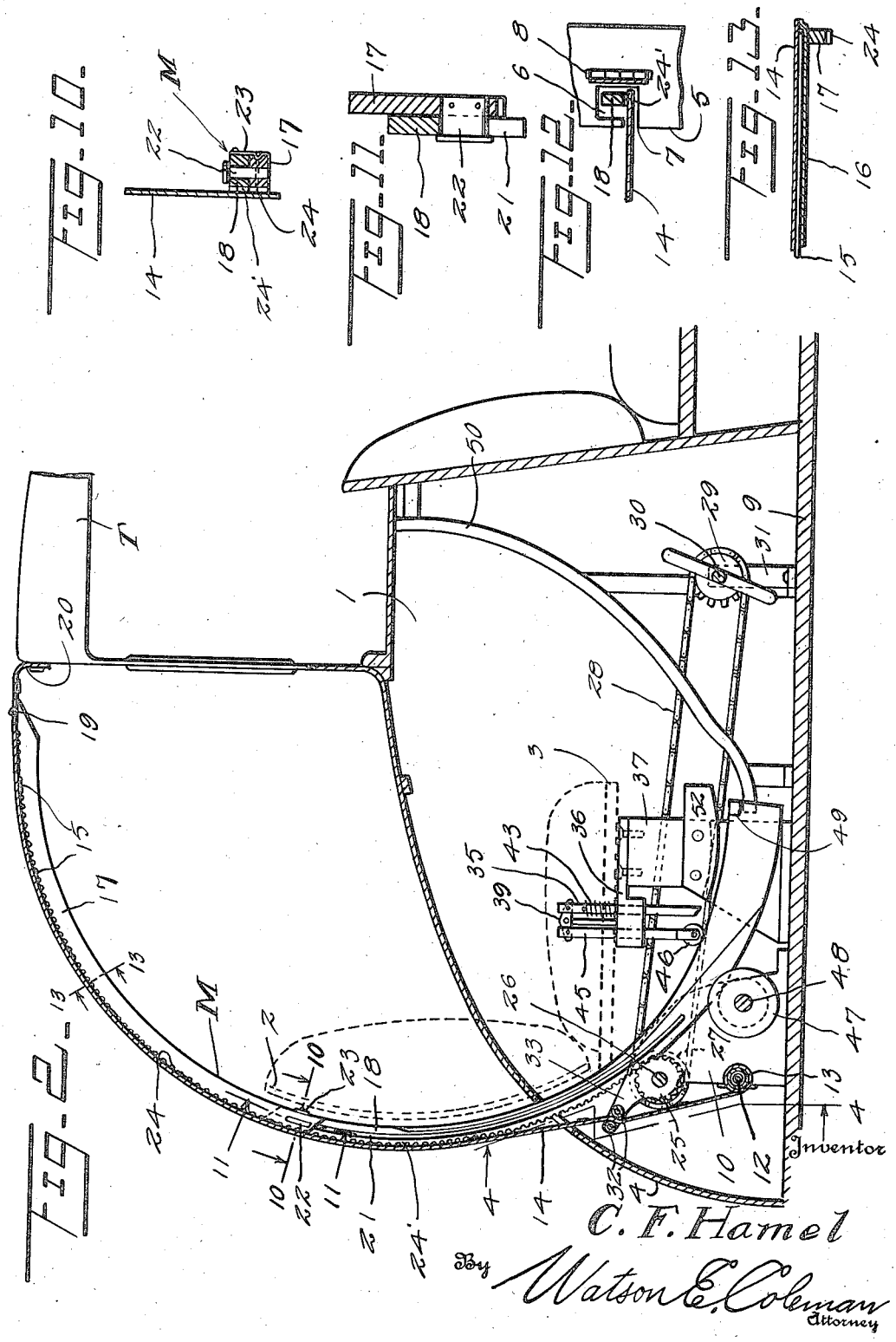

April 21, 1936.  C. F. HAMEL  2,038,490
TOP FOR RUMBLE SEATS
Filed April 11, 1933  3 Sheets-Sheet 3
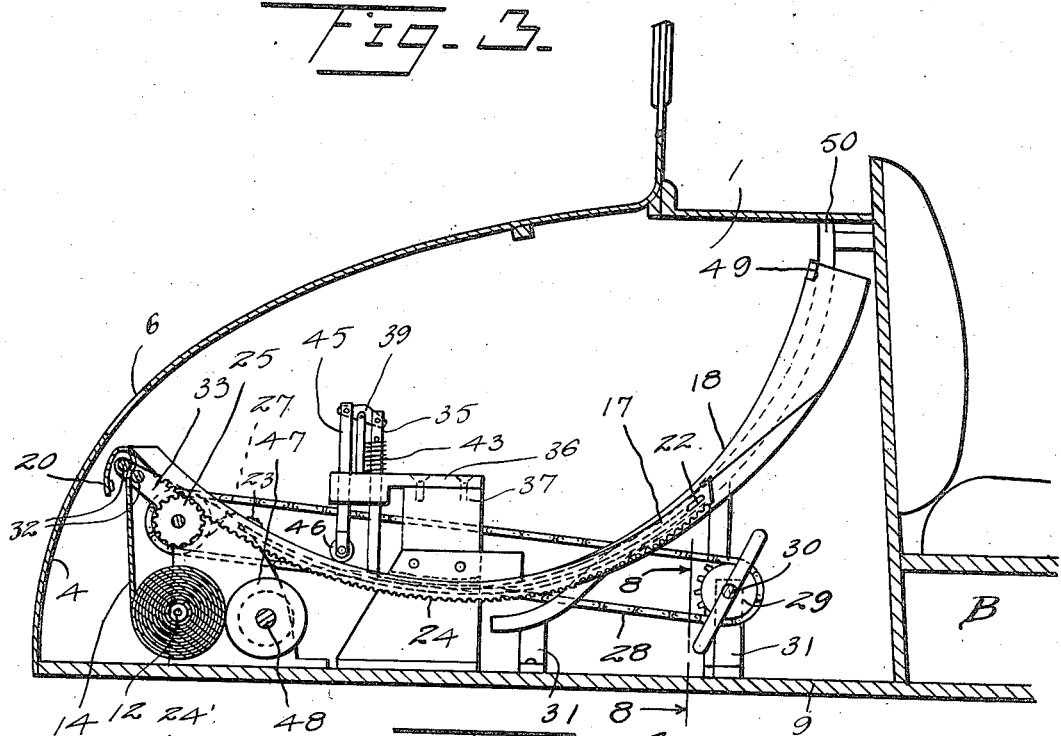
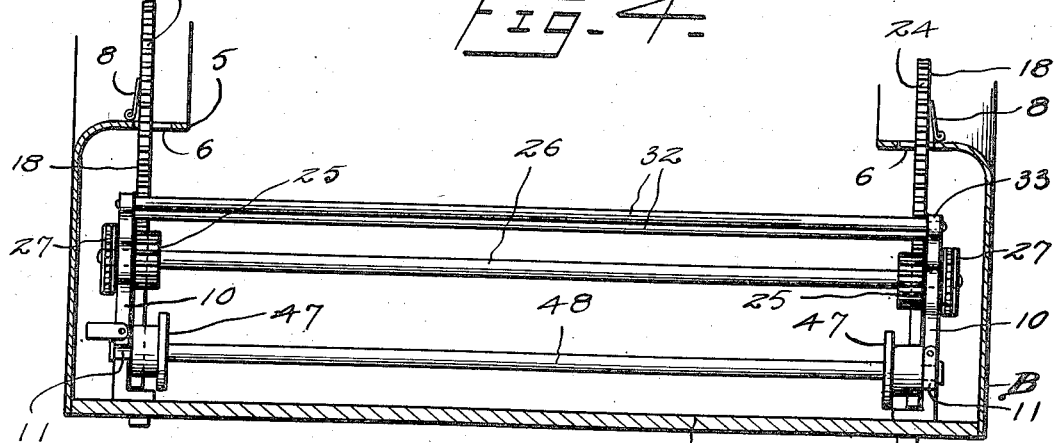
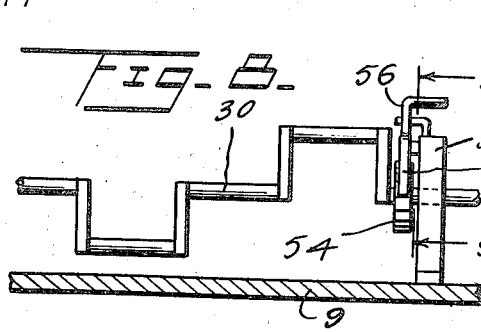
Inventor
C. F. Hamel
By Watson E. Coleman
Attorney Patented Apr. 21, 1936

2,038,490

UNITED STATES PATENT OFFICE 2,038,490

TOP FOR RUMBLE SEATS

Charles F. Hamel, New York, N. Y.

Application April 11, 1933, Serial No. 665,602

13 Claims. (Cl. 296—117)

This invention relates to a top for a rumble seat, and it is an object of the invention to provide a structure of this kind wherein the top can be readily raised or lowered by an occupant of the rumble seat.

It is also an object of the invention to provide a device of this kind constructed and assembled in a manner whereby when not in use the same can be housed within the rear or rumble chamber of the car body.

Another object of the invention is to provide a structure of this kind which can be applied to a car body without necessitating any material changing or redesigning of such body.

The invention consists in the details of construction and in the combination and arrangement of the several parts of my improved top for a rumble seat whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in perspective illustrating a rumble seat top constructed in accordance with an embodiment of my invention in extended or effective adjustment, the side curtains being omitted;

Figure 2 is an enlarged vertical sectional view taken through the structure as illustrated in Figure 1;

Figure 3 is a vertical sectional view taken through the rear portion of a car body with the rumble seat top in folded or concealed adjustment;

Figure 4 is a fragmentary detailed sectional view taken substantially on the line 4—4 of Figure 2;

Figure 5 is an enlarged fragmentary sectional view illustrating certain details of construction as herein employed coacting with a side arm;

Figure 6 is a sectional view taken substantially on the line 6—6 of Figure 5;

Figure 7 is a sectional view taken substantially on the line 7—7 of Figure 5;

Figure 8 is a sectional view taken substantially on the line 8—8 of Figure 3;

Figure 9 is a fragmentary view in side elevation of the structure illustrated in Figure 8, the post or bracket being indicated by broken lines;

Figure 10 is a sectional view taken substantially on the line 10—10 of Figure 2;

Figure 11 is a fragmentary sectional view taken substantially on the line 11—11 of Figure 2;

Figure 12 is a fragmentary sectional view taken substantially on the line 12—12 of Figure 1;

Figure 13 is a fragmentary sectional view taken substantially on the line 13—13 of Figure 2.

As illustrated in the accompanying drawings, 1 denotes the rear or rumble compartment of an automobile body B, the same being of a general type wherein the door 2 for the compartment when open constitutes a back for a conventional seat 3 indicated by broken lines in Figure 2.

The top wall 4 for the compartment 1 outwardly of each side of the door opening 5 and adjacent to the lower marginal portion of such opening 5 is provided with a relatively small opening 6 and also having a slot 7 affording communication between the opening 6 and the opening 5. Each of the openings 6 is normally closed by a flap 8, said flap readily swinging upwardly into open position. When closed the flap 8 serves to prevent entrance of foreign matter such as moisture and dust and the like into the rear or rumble compartment 1.

Within the compartment 1 and suitably mounted upon the floor 9 of such compartment at each side of the opening 5 and below the lower portion of such opening are the upstanding brackets 10. These brackets 10 in the lower portions of their vertical edges are provided with the conventional means, as at 11, whereby the extremities of a conventional spring roller 12 may be supported. This spring roller is adapted to have wound thereon the flexible top cloth 14. This cloth 14 at desired spaced relation therealong carries the transversely spaced stiffening rods or members 15. As particularly illustrated in Figure 13, each of these rods 15 is contained within a sheath 16.

The side or longitudinal marginal portions of this top cloth 14 lap or overlie the side supporting members M. Each of these members M, as herein disclosed, comprises two arcuate sections 17 and 18, the forward or free extremity of the forward section 17 having suitably connected thereto, as at 19, the outer end portion of the top covering or cloth 14. This covering or cloth 14, however, extends in advance of the sections 17 to provide a tremity of each of the sections 17 to provide a flap 20 for convenient detachable connection to the rear upper portion of the top T proper of the car body B. The sections of each member are disposed side by side as shown in Figure 11. The section 18 is provided along a major portion thereof with a slot 21 which has directed therethrough a lug or elongated coupling pin 22 whereby the outer section 17 may have sliding movement independently of the section 18 but in a direction to lap or overlie the section 17 when at the limit of its inward movement. This lug or elongated pin 22 is elongated in a direction lengthwise of the sections and thus assuring the maintenance of the sections in desired assembly at all times and particularly against swinging movement one relative to the other.

The formation of the lug or pin 22 is such to assure the section 17 having proper travel and particularly to have the section 17 extended in substantial continuity with the section 18. When fully extended a laterally projecting spring catch 23 carried by the rear end portion of the section 17 has locking engagement with the forward end portion of the section 18 as illustrated in detail in Figure 10. This locking means serves to hold the section 17 against return movement when fully extended and it is believed to be understood that the extent of forward or outward movement of the section 17 is limited by contact of the lug or pin 22 with the outer end wall of the slot 21.

When the members M are extended each passes out through an opening 6, the flap 8 readily moving into open position while the adjacent marginal portion of the flexible top cloth 14 passes through the slot 7 and when the device is in raised or extended into working position, as illustrated in Figures 1 and 2 of the drawings, if desired side curtains of any preferred type may be applied in any manner. As the side curtains form no particular part of the present invention a detailed description and illustration thereof is not believed necessary.

The outer margin of each of the sections 17 from substantially one end to the other is provided with the teeth 24 while the outer marginal portion of the associated inner section 18 is provided from its outer end to a desired point inwardly thereof with the teeth 24'. The teeth 24 and 24' are adapted to be engaged by a gear wheel 25 mounted for rotation upon a shaft 26. This shaft 26 is rotatably supported by the brackets 10 with a gear 25 inwardly of but closely adjacent to each of such brackets.

When the members M are fully retracted and the sections 17 and 18 in overlying relation, the forward end portion of the section 18 is free of the gear 25 but as the shaft 26 is rotated to raise or extend the members M shortly before the end of the forward section 17 of each of the members M passes beyond and free of the gear 25, the lug or pin 22 will have contact with the forward end wall of the slot 21 of the inner section 18 whereby as the section 17 is further advanced or raised as the shaft 26 rotates, the forward teeth of the section 18 will be brought into mesh with the gear 25.

The shaft 26 may be rotated as desired in any manner preferred but, as herein disclosed, the extremities of the shaft 26 outwardly of the brackets 10 have fixed thereto for rotation therewith the sprocket wheels 27. Each of these sprocket wheels has disposed therearound an endless sprocket chain 28 which in turn is disposed around a sprocket wheel 29 carried by an end portion of a crank or pedal shaft 30. This shaft 30, as herein disclosed, is rotatably supported at each end by an upstanding post or bracket 31 positioned forwardly of the opening 6 in the top wall for the rear or rumble compartment 1 and outwardly with respect to said opening 6. The crank or pedal shaft 30, however, is conveniently positioned whereby an occupant of the seat within the rear or rumble compartment 1 may readily rotate the shaft 30 in a direction to effect the desired raising or extending of the members M and, of course, the top cloth 14. When these members M are fully extended the person within the rear or rumble compartment 1 may readily fasten the flap 20 to the rear upper portion of the top T.

Reverse rotation of the shaft 30 will also return the members M and the top cloth 14 within the compartment 1. It is to be particularly noted in Figure 2 of the drawings that the travel of the members M is rearwardly of the raised door 2 and as the members M are lowered or returned the spring shaft or roller 12 automatically operates to wind up the top cloth 14.

The top cloth 14 within the compartment 1 and above the shaft or roller 12 passes through a pair of guide rollers 32. As herein disclosed, these rollers 32 are rotatably supported by and between the upper and rearwardly extending arms 33 comprised in the structure of the brackets 10.

In the raising of the members M as a result of the rotation of the shaft 26 it is highly important that the lower or inner section 18 of each of the members be positively held against upward or outward movement until substantially the time the lug or pin 22 of the outer section 17 starts to function as a coupling to effect the required upward movement of the section 18. In relatively close proximity to its forward end the upper margin of the inner section 18 is provided with a forwardly facing shoulder 34 with which is adapted to engage the lower end portion of a stop rod 35. This rod 35 extends upwardly and slidably through a guide block 36 positioned forwardly of and supported by the top portion of a bracket 37 suitably mounted upon the floor 9 of the compartment 1 and substantially aligned with a bracket 10. The upper end portion of the rod 35 is operatively connected, as at 38, with an end portion of an arm 39 pivotally connected substantially midway its ends, as at 40, with the upper portion of an upstanding post 41 carried by the guide block 36. Interposed between the upper surface of the block 36 and a pin 42 or the like carried by the upper portion of the rod 35 is an expansible member 43 herein disclosed as a coil spring encircling the rod 35.

This spring or member 43 operates to constantly urge the rod 35 upwardly to a position to free the rod 35 from the shoulder 34.

The end portion of the arm 39 remote from the rod 35 has operatively connected thereto, as at 44, a rod 45 which extends downwardly and slidably through the block 36 and the lower end portion of this rod 45 carries a roller 46 which is adapted to ride upon the inner marginal edge of the section 17 of the member M. As the sections 17 and 18 are arranged side by side the lower portion of this rod 45 must, of course, be laterally offset sufficiently to effect the desired positioning of the roller 46. During the time the roller 46 is rotating upon the inner marginal edge of the section 17 the rod 45 will be maintained in a raised position and the rod 35 in a lowered position for proper coaction with the shoulder 34. However, when the roller 46 rides off the inner end of the section 17 the spring 43 will immediately throw the rod 35 upwardly and out of working engagement with the shoulder 34 thus allowing the inner or lower section 18 to have desired outward or upward movement as hereinbefore referred to.

The inner or lower end portion of the outer marginal edge of the section 18 of each of the members M is free of teeth and provides a surface which contacts from above and rides upon a guide roller 47 rotatably mounted upon a shaft 48, said shaft 48 being supported by and between the brackets 10 and rearwardly of the shaft 12 hereinbefore referred to.

Each of the lower or inner sections 17 at its inner end is provided at its top portion with a laterally extended lug 49 which rides upon a cam guide and supporting track 50. This track 50 is so formed and positioned to assure the members M being conveniently compacted or housed within the compartment 1. The action of the track 50 upon the section 18 is readily permitted as the associated gear wheel 25 serves as a fulcrum upon which the sections 17 and 18 may be readily rocked or swung as required as the lug 49 travels along the track 50.

The section 18 of each of the members M travels across and closely adjacent to the bracket 37 and below a laterally disposed shoulder 51 herein disclosed as provided as a result of increasing the thickness of the upper portion of the bracket 37. The upper portion of the bracket 37 has secured thereto a plate 52 extending across the bracket 37 and depending a desired distance below the shoulder 51. The section 18 has an upstanding rib or flange 53 which is adapted to ride in the trackway provided between the depending portion of the plate 52 and the upper reduced portion of the bracket 37. This effectively holds the members M in a desired path of travel and particularly against inward lateral movement.

Each of the trackways 50 may be supported in desired position in any manner preferred.

It is also to be stated that any means may be employed to hold the shaft 30 against retrograde rotation. This is of advantage as it will permit the top cloth 14 to be raised or extended any desired distance and which is of importance should it be desired to use the top as a sunshade.

As particularly illustrated in Figures 8 and 9, the shaft 30 has fixed thereto a ratchet wheel 54 with which coacts a dog or pawl 55. This dog or pawl 55 has associated therewith an operating arm 56 whereby when it is desired to lower the mechanism the dog or pawl 55 may be readily freed from the ratchet wheel 54. However, just so long as the dog or pawl 55 is engaged with the ratchet wheel 54 the shaft 30 is held against retrograde movement and the members M in desired raised or extended adjustment.

From the foregoing description it is thought to be obvious that a top for a rumble seat constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In a vehicle body, a flexible top therefor, a spring roller upon which the top is wound, supporting members for the top, each of said supporting members comprising two arcuate sections, the free end of the top being attached to one of said sections of each member, said sections being connected for sliding movement one with respect to the other to allow one section to overlap the other, means initially engageable with the section of each of the members to which the top is attached for raising the same into extended position and successively engaging the adjacent section of each of the members when the first section has been raised or extended to a predetermined extent, a holding member engaging the second section to hold the same against movement, and means contacting with the first section to maintain the holding member in working position until the first section has reached substantially the end of its outward movement, the means then releasing the second named section.

2. A vehicle body, a flexible top therefor, a spring roller upon which the top is wound, laterally spaced supporting members for the top, each of said members comprising two arcuate sections, to one of which the free end of the top is attached, means for connecting the sections for relative endwise movement, the outer section having initial movement independently of the other, gears carried by the body, the sections of each of the members having teeth with which a gear meshes, said gear being free of the second section when the sections are collapsed, means section when the sections are collapsed, means for rotating the gears, and means for initially moving the second section of each of the supporting members to bring the same in mesh with the gear immediately that the first section of a member has been substantially fully extended.

3. A vehicle body, a flexible top therefor, supporting members for the top, each of said members comprising two arcuate sections, means for connecting the sections for relative endwise movement, the outer section having initial movement independently of the other, gears carried by the body, the sections of each of the members having teeth with which a gear meshes, said gear being free of the second section when the sections are collapsed, means for rotating the gears, the second section of each of the members having a slot therealong, a part carried by the first section extending within said slot, said part providing a means for imparting initial movement to the second section after the first section has been substantially entirely extended.

4. A vehicle body, a flexible top therefor, supporting members for the top and on which the top is directly supported, each of said members comprising two arcuate sections, means for connecting the sections for relative endwise movement, the outer section having initial movement independently of the other, the flexible top having its forward end connected directly to the forward end of the outer sections, gears carried by the body, the sections of each of the members having teeth with which a gear meshes, said gear being free of the second section when the sections are collapsed, means for rotating the gears, the second section of each of the members having a slot therealong, a part carried by the first section extending within said slot, said part providing a means for imparting initial movement to the second section after the first section has been substantially entirely extended, said part being elongated in a direction lengthwise of the first section to provide means to hold the outer section against swinging movement relative to the second section.

5. A vehicle body, a flexible top therefor, arcuate supporting members for the top and on which the top is directly supported, each supporting member comprising two sections, means for connecting said sections for sliding movement one with respect to the other and into extended relation or overlapping relation, means for extending said sections successively, the free end of the top being directly attached to those sections of said supporting members which are first extended, a member for guiding the travel of the inner end portion of the second section of each of the members, said second section having a shoulder, a stop rod slidably supported by the guide member, a second rod slidably supported by the guide member and having one end portion adapted to engage the first member, an operative connection between the two rods whereby the stop rod is in engagement with the shoulder of the second section when the second rod is in engagement with the first section, and means for moving the stop rod free of the shoulder when the second rod is ineffective.

6. In an automobile having a rumble compartment and a rumble seat therein, a flexible top, one end of which is disposed within the compartment rearward of and below the seat, laterally disposed arcuate supporting members for the top to the forward ends of which the forward end of the top is attached, said arcuate members being movable in an arcuate path from a position entirely within said compartment and below the level of the seat to a position extending upward and above the seat and to a point forward thereof, and manually operable means for positively projecting and positively retracting said members and holding them in a projected position.

7. In an automobile having a rumble compartment and a rumble seat therein, a flexible top, one end of which is disposed within the compartment rearward of and below the seat, laterally disposed arcuate supporting members for the top, to the forward ends of which the forward end of the top is attached, guiding means disposed entirely within the compartment and below the level of the seat and with which the arcuate members engage and whereby they are guided in an arcuate path from a position entirely within the compartment to a position extending upward and over the compartment, and manually operable means for positively projecting or retracting said members and holding the members in projected positions.

8. In an automobile having a rumble compartment and a rumble seat therein, a flexible top, one end being disposed within the compartment rearward of and below the level of the seat, two supporting members for the top, one on each side thereof and each comprising two arcuate sections having sliding telescopic engagement with each other and movable from a position entirely within the compartment and below the level of the seat to an extended position over the compartment, means whereby the sections of each member may be successively moved in an arcuate path to raise or lower the sections, and means for detachably locking the sections in a raised position with one section of each member extended beyond the other, the top being attached at its free forward end to the most extended section of each member and being directly supported by and on said members.

9. In an automobile having a rumble compartment and a rumble seat therein, a flexible top, a spring roller disposed within the rear end of the compartment and upon which the top is wound, and laterally spaced arcuate supporting members to the forward ends of which the free forward end of the top is attached, said arcuate members when fully extended extending forward and upward over the seat and slightly beyond the seat, means within the rumble compartment and below the seat for supporting said arcuate members for movement in an arcuate path from a position entirely within said compartment and below the seat to a position extending upward rearward of the seat and entirely over the compartment, and manually operable means for projecting or retracting said members and holding them in their projected position.

10. In a vehicle body, a flexible top therefor, a spring roller on which the top is wound, supporting members for the top on which the top is directly supported, each of said supporting members comprising two laterally spaced arcuate sections disposed side by side, said sections being connected for sliding movement one with respect to the other to allow one section to overlie the other, the top being attached at its free end to the forward end of one of the sections of each member, means initially engageable with one of the sections of each member for raising the same into a projected position and successively engaging the adjacent section of each of the members when the first section has been raised and projected to a predetermined extent, and means for holding the second section of each of the members against movement as the first section is being projected, said means automatically releasing the second section of each member when the first section has been fully projected.

11. In a vehicle body having a rumble seat compartment, a seat therein, and a seat back hingedly mounted to close said compartment, a flexible top for the compartment, a spring roller within the compartment to which the rear end of the top is connected, laterally disposed arcuate top-supporting members normally disposed and entirely in the compartment on each side of the seat therein and to the forward ends of which the forward end of the top is attached, means for supporting and guiding said members for movement in an arcuate path extending upward and rearward of the seat and back and then upward and forward with relation to the seat, whereby the members may be shifted to a position with their forward ends above and in advance of the seat, and manually operable means engaging the members whereby they may be positively shifted to the last named position or retracted into the compartment.

12. In a vehicle body having a rumble seat compartment, a seat therein, and a seat back hingedly mounted to close said compartment, a flexible top for the compartment, a spring roller within the compartment to which one end of the top is connected, laterally disposed arcuate top-supporting members normally disposed and entirely in the compartment on each side of the seat therein and to the forward ends of which the forward end of the top is attached, means for supporting and guiding said members for movement in an arcuate path upward and rearward of the seat and back, whereby the members may be shifted to a position with their forward ends above and in advance of the seat, manually operable means engaging the members whereby they may be positively shifted to the last named position or retracted into the compartment, each of said members consisting of a forward and a rearward section having sliding movement on each other, these sections when retracted being disposed side by side and when projected the forward section constituting a continuation of the rearward section and manually operable means engaging the sections whereby the forward and rear sections may be successively shifted to their projected positions or successively retracted.

13. In a vehicle body having a rumble seat compartment, a seat therein, and a seat back hingedly mounted to close said compartment, a flexible top for the compartment, a spring roller within the compartment to which one end of the top is connected, laterally disposed arcuate top-supporting members normally disposed entirely in the compartment on each side of the seat therein and to the forward ends of which the forward end of the top is attached, means for supporting and guiding said members for movement in an arcuate path upward and rearward of the seat and back, whereby the members may be shifted to a position with their forward ends above and in advance of the seat, manually operable means engaging the members whereby they may be positively shifted to the last named position or retracted into the compartment, each of said members consisting of a forward and a rear section having sliding movement on each other, both of said sections having rack teeth thereon, and manually operable gear wheels coacting with said rack teeth and successively engaging the rack teeth on the forward section and the rack teeth on the rear section.

CHARLES F. HAMEL.